(12) United States Patent
Mak

(10) Patent No.: US 12,058,442 B2
(45) Date of Patent: Aug. 6, 2024

(54) CAMERA STABILIZER MODULE AND PHOTOGRAPHING DEVICE COMPRISING THE SAME

(71) Applicant: VISTA INNOTECH LIMITED, Hong Kong (HK)

(72) Inventor: Lin Chi Mak, Hong Kong (HK)

(73) Assignee: VISTA INNOTECH LIMITED, Hong Kong (HK)

( * ) Notice: Subject to any disclaimer, the term of this patent is extended or adjusted under 35 U.S.C. 154(b) by 108 days.

(21) Appl. No.: 17/887,509

(22) Filed: Aug. 15, 2022

(65) Prior Publication Data

US 2023/0019176 A1  Jan. 19, 2023

Related U.S. Application Data

(63) Continuation-in-part of application No. PCT/CN2022/071618, filed on Jan. 12, 2022.

(30) Foreign Application Priority Data

Jul. 14, 2021 (CN) .......................... 202110798416.2

(51) Int. Cl.
*H04N 23/68* (2023.01)
*H04N 23/51* (2023.01)
*H04N 23/54* (2023.01)

(52) U.S. Cl.
CPC .......... *H04N 23/687* (2023.01); *H04N 23/51* (2023.01); *H04N 23/54* (2023.01)

(58) Field of Classification Search
CPC ...... H04N 23/687; H04N 23/51; H04N 23/54; H04N 23/57
See application file for complete search history.

(56) References Cited

U.S. PATENT DOCUMENTS

| 8,208,031 B2 | 6/2012 | Makimoto et al. | |
|---|---|---|---|
| 2007/0077805 A1* | 4/2007 | Nomura | H04N 23/68 |
| | | | 348/E5.046 |
| 2010/0013939 A1* | 1/2010 | Ohno | H04N 23/54 |
| | | | 348/208.5 |
| 2018/0376042 A1* | 12/2018 | Kim | H04N 23/80 |
| 2020/0083793 A1* | 3/2020 | Han | G02B 27/646 |

FOREIGN PATENT DOCUMENTS

| CN | 102749697 B | 3/2015 |
|---|---|---|
| CN | 107315302 A | 11/2017 |
| CN | 112415708 A | 2/2021 |
| CN | 112423468 A | 2/2021 |
| CN | 110892704 B | 3/2021 |

\* cited by examiner

*Primary Examiner* — Gevell V Selby

(57) ABSTRACT

A camera stabilizer module includes: a housing; a sensor assembly including a lens and an image sensor; an elastic circuit board including a first board body and a second board body, the image sensor being connected to the first board body, the first board body being connected to the second board body through a connecting portion, the connecting portion extending toward an outward side of a surface of the first board body, and the second board body being connected to the first housing; a stabilizer assembly including a stabilizing coil and a stabilizing magnet that are facing each other; and a controller electrically connected to the elastic circuit board, where the stabilizing coil is provided around the image sensor, and the stabilizing magnet is facing the stabilizing coil and provided around the lens.

14 Claims, 8 Drawing Sheets

CAMERA STABILIZER MODULE AND PHOTOGRAPHING DEVICE COMPRISING THE SAME

CROSS REFERENCE TO RELATED APPLICATIONS

The present application is a Continuation-In-Part Application of PCT Application No. PCT/CN2022/071618 filed on Jan. 12, 2022, which claims the benefit of Chinese Patent Application No. 202110798416.2 filed on Jul. 14, 2021. All the above are hereby incorporated by reference in their entirety.

TECHNICAL FIELD

The present disclosure relates to a technical field of camera stabilizers, and in particular to a camera stabilizer module and a photographing device comprising the same.

BACKGROUND

In recent years, small mobile devices having a photographing function, including smartphones, smart glasses, sports cameras, body-worn cameras, and automobile data recorders, have been popularized and applied to more fields. In each of these devices, there is at least a zoom, auto-focus, or fixed-focus compact camera module. When the devices are used to take photos and videos, the photos and videos are prone to blur or drift due to external vibrations, with an undesirable quality. This problem is particularly severe in the cases of intense vibrations or low-light scenarios.

In order to solve above problems, different stabilizer techniques are emerging in markets. Existing mainstream techniques are implemented by reading a vibration sensor (such as a gyroscope and an acceleration sensor), calculating a vibration waveform and a required compensating angle, and making compensations electronically, optically, or mechanically for image blurs and drifts caused by the vibrations, thereby improving the quality of images.

A sensor-shift stabilizer (SSS) works with a mechanical method. Specifically, it shifts an image sensor with an actuator, such that an optical component and the image sensor move relatively to counteract the image drifts due to the vibrations. Without moving a heavy lens during stabilization, the SSS is advantageous in a high-frequency stabilization effect and in reducing power consumption.

For the conventional SSS (refer to patents: CN 102749697 B, CN 110892704 B, and U.S. Pat. No. 8,208,031 B2), at least one multiple-degree-of-freedom sensor circuit board is required to connect unmovable and movable parts, the multiple-degree-of-freedom sensor circuit board involves a multi-folding process or a non-conventional and complicated elastic circuit board manufacturing process, and the circuit board is connected to an image sensor and at least two positioning sensors to achieve the closed-loop stabilization control effect. Therefore, the conventional SSS are defective mainly in the high production cost, complicated production, low yield, and large size of the camera module.

SUMMARY

An objective of the present disclosure provides a camera stabilizer module and a photographing device comprising the same. The present disclosure supports shifts and rotation of a multi-axis image sensor, with a simple and compact structure, and an easy assembly for mass production and automatic production.

To achieve the above objective, the present disclosure provides a camera stabilizer module, including:

a housing including a first housing;

a sensor assembly including a lens and an image sensor, the lens being fixed on the first housing;

an elastic circuit board including a first board body and a second board body, where the image sensor is connected to the first board body, the first board body is connected to the second board body through a connecting portion, the connecting portion extends toward an outward side of a surface of the first board body, the second board body is connected to the first housing, the connecting portion includes a first connecting arm and a second connecting arm that are connected to each other, one end of the first connecting arm is connected to the first board body, one end of the second connecting arm is connected to the second board body, a plane where the first connecting arm is located serves as a first plane, a plane where the second connecting arm is located serves as a second plane, an included angle between the first plane and the second plane falls within a range of 70-110°, and both an included angle between the first plane and the surface of the first board body, and an included angle between the second plane and the surface of the first board body fall within the range of 70-110°;

a stabilizer assembly including a stabilizing coil and a stabilizing magnet that are facing each other, the stabilizing coil being electrically connected to the elastic circuit board; and a controller being electrically connected to the elastic circuit board, where the stabilizing coil is provided around the image sensor, and the stabilizing magnet is facing the stabilizing coil and provided around the lens, such that when the stabilizing coil is energized, the image sensor can be driven to move along at least two axial directions.

The camera stabilizer module provided by the embodiment of the present disclosure achieves the following beneficial effects over the prior art: The elastic circuit board is provided in the first housing. The first board body serving as a movable end and the second board body serving as a fixed end are provided in the elastic circuit board. The first board body is connected to the elastic connecting portion extending toward the outward side of the surface of the first board body. Consequently, the first board body has a degree of freedom (DOF) to shift and rotate in the plane where the first board body is located, and the image sensor connected to the first board body can also shift and rotate with the first board body. When the camera stabilizer module works, the controller controls supply power to the stabilizing coil via the elastic circuit board or stabilizing springs. After the stabilizing coil is energized, the first board body is driven to shift or rotate under the influence of a magnetic force of the stabilizing magnet, thereby driving the first board body to implement biaxial or triaxial stabilization of the camera module. The elastic circuit board in the present disclosure has the simple and compact structure, and easy assembly for mass production and automatic production. It can provide the DOF for the stabilization in a small space, effectively reduce the multi-axis spring constant, and lower the stabilization power consumption.

The camera stabilizer module in the embodiment of the present disclosure may further include a sensor carrier plate and a lens carrier plate that may be arranged in parallel, the sensor carrier plate may be fixed on the first board body, the lens carrier plate may be fixed on the first housing, the image sensor may be fixed on the sensor carrier plate, and the lens may be fixed on the lens carrier plate.

According to the camera stabilizer module in the embodiment of the present disclosure, the stabilizing coil may include a first coil group and a second coil group; the stabilizing magnet may include a first magnet group; both the first coil group and the second coil group may be fixed on the sensor carrier plate; the first magnet group may be provided above the first coil group; with a magnetic field formed by the first magnet group, the energized first coil group may drive the sensor carrier plate to shift in a plane where the first board body may be located; and with the magnetic field formed by the first magnet group, the energized second coil group may drive the sensor carrier plate to rotate in the plane where the first board body may be located.

According to the camera stabilizer module in the embodiment of the present disclosure, the first coil group may include at least one first coil at an edge of one side of the sensor carrier plate; the second coil group may include at least two coils arranged in a length direction of the second coil group; the at least two coils in the second coil group may have opposite current directions; the second coil group may be symmetric to the first coil group with respect to the image sensor, and may be provided at the other side of the sensor carrier plate; and the first magnet group may include a magnet right above the first coil group and a magnet right above the second coil group.

According to the camera stabilizer module in the embodiment of the present disclosure, an included angle between directions of ampere forces generated by the two coils in the second coil group may be greater than 160°.

According to the camera stabilizer module in the embodiment of the present disclosure, the first coil group may further include a third coil, the third coil may be perpendicular to the first coil, the stabilizing magnet may include a second magnet group, and the second magnet group may be parallel to the third coil and provided above the third coil, such that the energized third coil drives the sensor carrier plate to shift along a length direction of the first coil.

The camera stabilizer module in the embodiment of the present disclosure may further include a focus assembly, where the focus assembly may include a focus magnet fixed inside the first housing and a focus coil facing the focus magnet and provided on the lens carrier plate, and the focus coil may be electrically connected to the elastic circuit board via a focus spring group and may drive the lens carrier plate to move under an action of the focus magnet when energized.

The camera stabilizer module in the embodiment of the present disclosure may further include at least four groups of stabilizing springs, where the stabilizing springs each may include two ends connected to the locating seat and the sensor carrier plate; the stabilizing springs may be uniformly distributed at edges or corners of the sensor carrier plate; each group of the stabilizing springs may include at least one spaced spring piece; and the two ends of the stabilizing springs each may be electrically connected to a part or all of the stabilizing coil.

According to the camera stabilizer module in the embodiment of the present disclosure, the housing may further include a second housing, the second housing may be fixed on the second board body, and a dust cover may be provided between the first housing and the second housing.

The present disclosure further provides a photographing device, including the camera stabilizer module in the above embodiment.

The photographing device provided by the embodiment of the present disclosure achieves the following beneficial effects over the prior art: The photographing device includes the above camera stabilizer module. The elastic circuit board is provided in the first housing of the camera stabilizer module. The first board body serving as a movable end and the second board body serving as a fixed end are provided in the elastic circuit board. The first board body is connected to the elastic connecting portion extending toward the outward side of the surface of the first board body. Consequently, the first board body has a DOF to shift and rotate in the plane where the first board body is located, and the image sensor connected to the first board body can also shift and rotate with the first board body. When the camera stabilizer module works, the controller controls supply power to the stabilizing coil via the elastic circuit board or stabilizing springs. After the stabilizing coil is energized, the first board body is driven to shift or rotate under the influence of a magnetic force of the stabilizing magnet, thereby driving the first board body to implement biaxial or triaxial stabilization of the camera module. The present disclosure has the simple and compact structure, and easy assembly for mass production and automatic production. It can provide the DOF for the stabilization in a small space, effectively reduce the multi-axis spring constant, and lower the stabilization power consumption.

Additional aspects and advantages of the present disclosure will be partly provided in the following description, and partly become evident in the following description or understood through the practice of the present disclosure.

Figure 1:
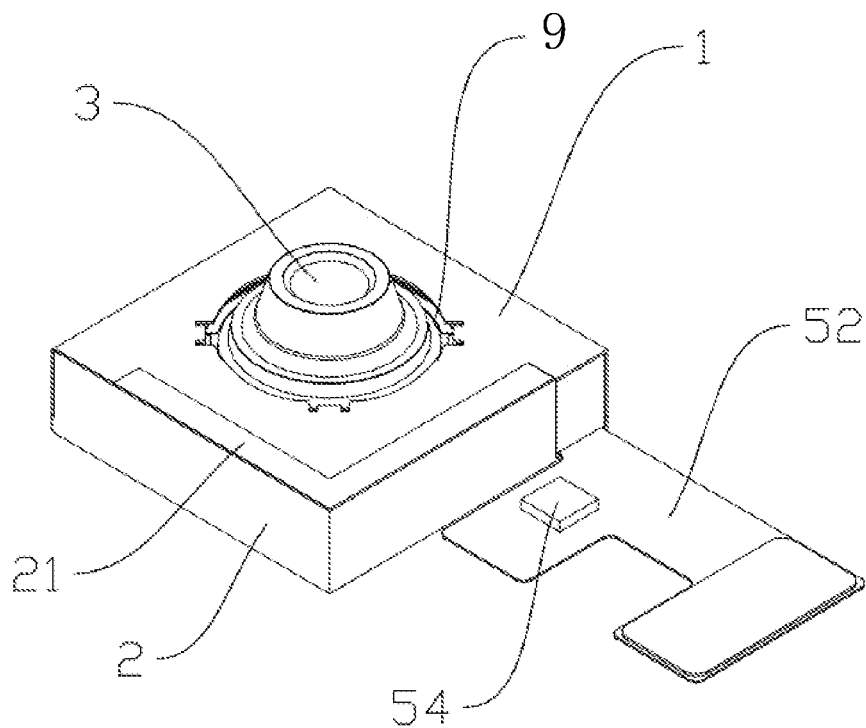
FIG. 1 is an external structural view of a camera stabilizer module according to an embodiment of the present disclosure.
Figure 1:
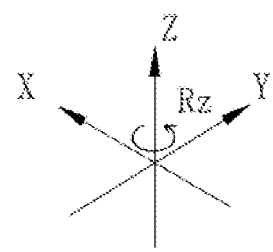

In the figures: 1: first housing, 11: locating seat, 12: accommodation cavity, 2: second housing, 21: dust cover, 3: lens, 4: image sensor, 5: elastic circuit board, 51: first board body, 52: second board body, 53: connecting portion, 531: first connecting arm, 532: second connecting arm, 533: bending portion, 534: third board body, 535: fourth board body, 54: controller, 6: sensor carrier plate, 7: lens carrier plate, 8: stabilizer assembly, 801: stabilizing coil, 81: first coil group, 811: first coil, 812: third coil, 82: second coil group, 802: stabilizing magnet, 83: first magnet group, 83a: shifting magnet, 83b: rotating magnet, 84: second magnet group, 85: stabilizing spring, 851: spring piece, 8511: fixed portion, 85111: first locating groove, 85112: first clamping groove, 8512: elastic portion, 8513: movable portion, 85131: second locating groove, 85132: second clamping groove, 9: focus assembly, 91: focus magnet, 92: focus coil, 93: focus spring group, and 10: sensor assembly.

DETAILED DESCRIPTION

The embodiments of the present disclosure are described below in detail. Examples of the embodiments are shown in the drawings. The same or similar numerals represent the same or similar elements or elements having the same or similar functions throughout the specification. The embodiments described below with reference to the drawings are exemplary. They are only used to explain the present disclosure, and should not be construed as a limitation to the present disclosure.

In the description of the present disclosure, it should be understood that the orientational or positional relationships indicated by terms such as "upper", "lower", "front", "rear", "left", "right", "top", "bottom", "inside" and "outside" are based on the drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure.

In the description of the present disclosure, "several" means a number larger than one, while "a plurality of" means a number larger than two; "greater than", "less than", "over" and the like are construed as not including the number, and "above", "below", "within" and the like are construed as including the number. The "first" and "second" in the description are merely intended to distinguish technical features, and cannot be construed as indicating or implying a relative importance or implicitly indicating a number of indicated technical features or implicitly indicating a sequence relationship of the indicated technical features.

In the description of the present disclosure, unless otherwise explicitly defined, the words such as "arrange", "install" and "connect" should be understood in a broad sense, and those skilled in the technical field can reasonably determine the specific meanings of the above words in the present disclosure in combination with specific contents of the technical solutions.

Figure 2:
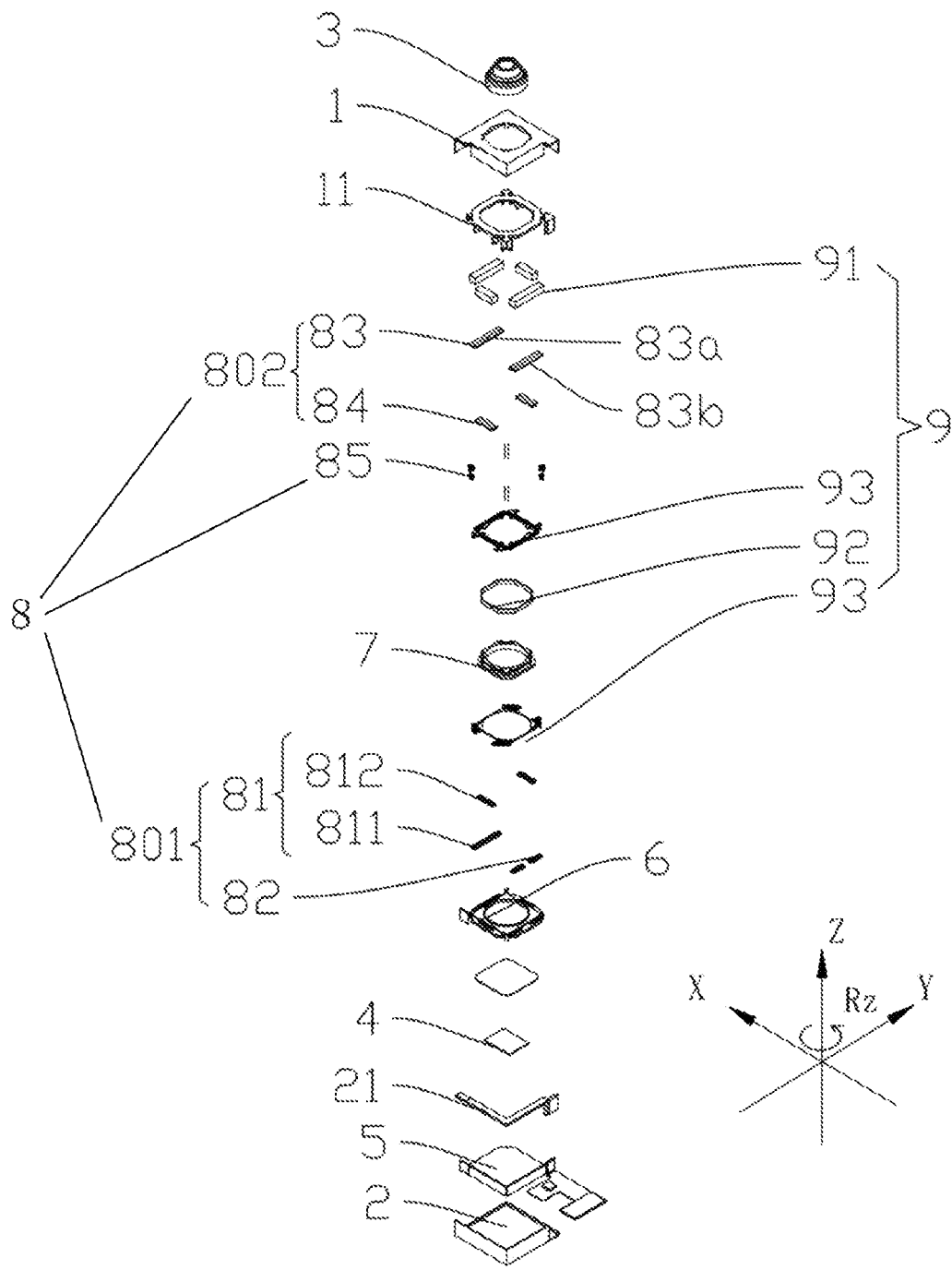
FIG. 2 is an internal exploded view of a camera stabilizer module according to an embodiment of the present disclosure.
Figure 3:
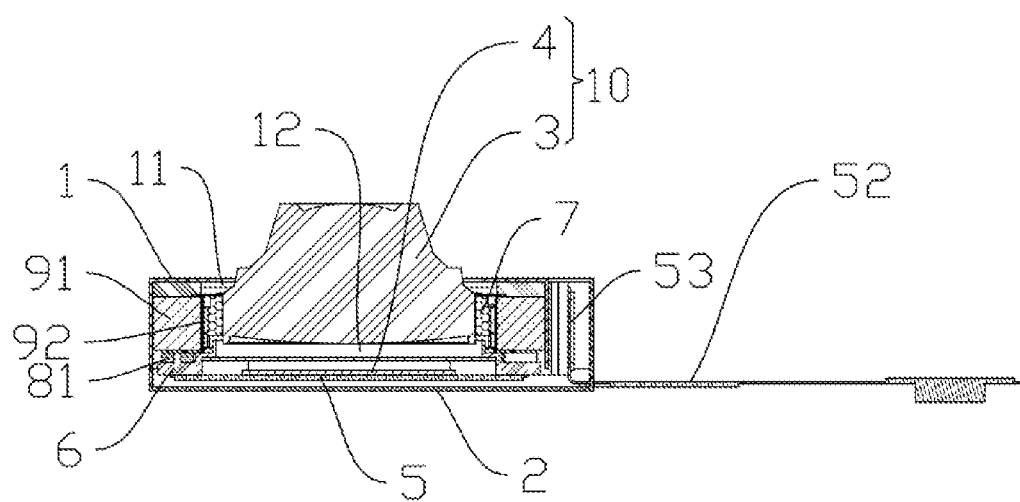
FIG. 3 is a longitudinal sectional view of a camera stabilizer module according to an embodiment of the present disclosure.

As shown in FIGS. 1-3, a photographing device in a preferred embodiment of the present disclosure includes at least one camera stabilizer module, configured to compensate a shake of a lens 3 by moving a sensor during photographing.

As shown in FIGS. 1-3, the camera stabilizer module in the preferred embodiment of the present disclosure includes a housing. The housing includes a first housing 1 and a second housing 2. The second housing 2 is located under the first housing 1. An accommodation cavity 12 is formed between the first housing 1 and the second housing 2. A sensor assembly 10, an elastic circuit board 5, a stabilizer assembly 8, and a focus assembly 9 are arranged in the accommodation cavity 12.

In some embodiments of the present disclosure, the first housing 1 and the second housing 2 each are provided with a sidewall so as to seal the accommodation cavity 12 in various directions. Further, a dust cover 21 for preventing dust from entering the accommodation cavity 12 is provided between the first housing 1 and the second housing 2.

As shown in FIGS. 1-3, the camera stabilizer module in the preferred embodiment of the present disclosure includes the sensor assembly 10. The sensor assembly 10 includes a lens 3 and an image sensor 4. The lens 3 is provided above the image sensor 4. The lens 3 is fixed on a lens carrier plate 7. The image sensor 4 is fixed on the movable elastic circuit board 5. The elastic circuit board 5 includes a first board body 51 and a second board body 52. The image sensor 4 is connected to the first board body 51. The first board body 51 is connected to the second board body 52 through a connecting portion 53. The connecting portion 53 extends toward an outward side of a surface of the first board body 51. The outward side refers to a direction away from the image sensor 4. The second board body 52 is connected to the first housing 1. Preferably, a fixed seat 11 is provided in the first housing 1. An inner diameter of the fixed seat 11 is matched with an outer diameter of the lens 3, so as to fix the lens 3 on the first housing 1. Further, a soft material may be provided between the housing and the elastic circuit board 5 to improve the stabilization effect. Metal powders may be provided in the soft material to improve the heat dissipation effect.

As shown in FIGS. 1-3, in some embodiments of the present disclosure, the camera stabilizer module further includes a sensor carrier plate 6 and a lens carrier plate 7 that are arranged in parallel. The sensor carrier plate 6 is fixed on the first board body 51. The lens carrier plate 7 is fixed on the first housing 1 through the focus spring group 93. The image sensor 4 is fixed on the sensor carrier plate 6, and may move with the sensor carrier plate 6. The lens 3 is fixed on the lens carrier plate 7. Specifically, there may be a plurality of the image sensors 4 on the sensor carrier plate 6.

Figure 4:
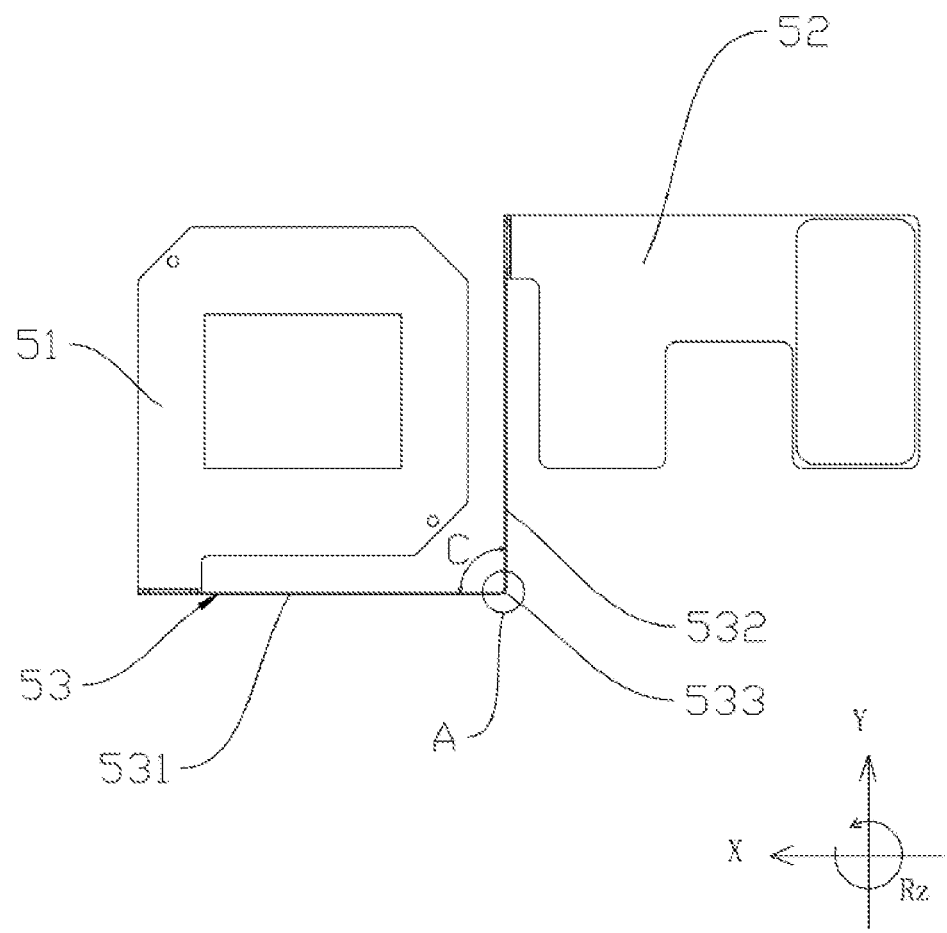
FIG. 4 is a structural view of an elastic circuit board of a camera stabilizer module according to an embodiment of the present disclosure.

As shown in FIG. 4, in some embodiments of the present disclosure, the connecting portion 53 includes a first connecting arm 531 and a second connecting arm 532 that are connected to each other. One end of the first connecting arm 531 is connected to the first board body 51. One end of the second connecting arm 532 is connected to the second board body 52. A plane where the first connecting arm 531 is located serves as a first plane. A plane where the second connecting arm 532 is located serves as a second plane. An included angle B1 is formed between the first plane and the surface of the first board body 51, 70°≤B1≤110°. An included angle B2 is formed between the second plane and the surface of the first board body 51, 70°≤B2≤110°. There is an enough space for the movement of the connecting portion 53 in the plane where the first board body 51 is located, and an enough rotational DOF for the connecting portion 53. Preferably, both the first plane and the second plane are perpendicular to the surface of the first board body 51. The connecting portion 53 is perpendicular to the surface of the first board body 51, which maximizes a rotational angle and a DOF of the connecting portion 53 relative to the plane where the first board body 51 is located.

As shown in FIG. 4, in some embodiments of the present disclosure, an included angle C is formed between the first plane and the second plane, 70°≤C≤110°. Preferably, the included angle C between the first plane and the second plane is 90°. The first connecting arm 531 is located in an X-axis direction of the plane where the first board body 51 is located. The second connecting arm 532 is located in a Y-axis direction of the plane where the first board body 51 is located. Both the first connecting arm 531 and the second connecting arm 532 are perpendicular to the first board body 51.

As shown in FIG. 4, in some embodiments of the present disclosure, a length-to-thickness ratio of the first connecting arm 531 is greater than 10, and a length-to-thickness ratio of the second connecting arm 532 is greater than 10, which provides an enough shifting space, makes the device more flexible, ensures the elasticity of the first connecting arm 531 and the second connecting arm 532, and prevents the damage to the first connecting arm 531 and the second connecting arm 532 during shift or rotation in the plane where the first board body 51 is located.

As shown in FIG. 4, in some embodiments of the present disclosure, in terms of the length, the first connecting arm 531 and the second connecting arm 532 of the connecting portion 53 are 50% greater than a width and a length of any housing.

As shown in FIG. 4, in some embodiments of the present disclosure, the first connecting arm 531 and the second connecting arm 532 are connected through a bending portion 533. The bending portion 533 is L-shaped, with an opening toward the first board body 51. With the bending portion 533, the first connecting arm 531 and the second connecting arm 532 are connected perpendicularly, which can provide a larger moving range for the first connecting arm 531 or the second connecting arm 532, and thus further increases the elasticity and reliability of the connecting portion 53 and particularly the elasticity and reliability during rotation, improves the stabilization compensating angle and lowers the stabilization power consumption.

Figure 5:
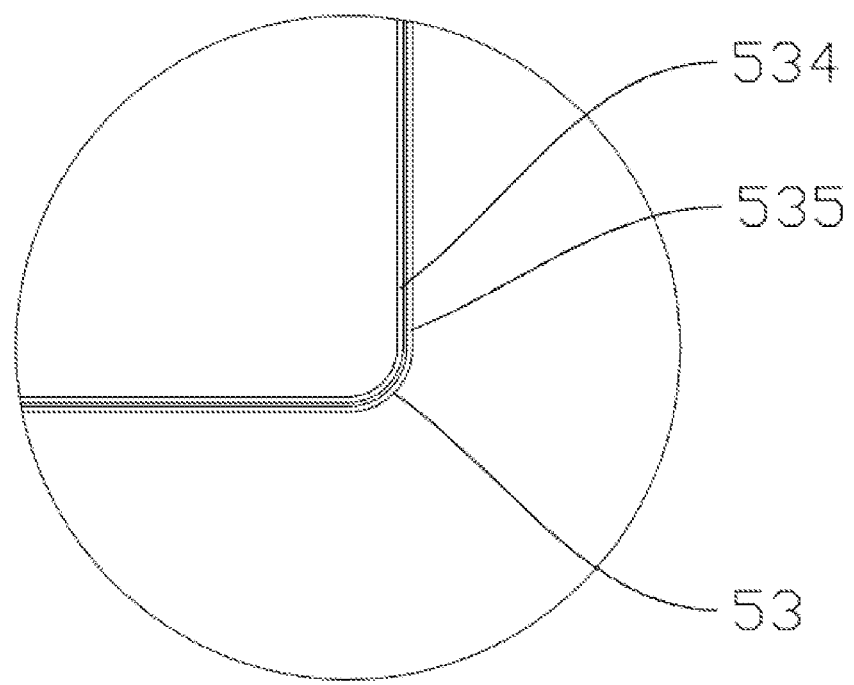
FIG. 5 is a structural view of an embodiment of a connecting portion of part A in FIG. 4.

As shown in FIG. 5, in some embodiments of the present disclosure, the connecting portion 53 includes at least two layers of stacked board bodies. There is a gap between the board bodies. Specifically, the connecting portion 53 includes a third board body 534 close to the first board body 51 and a fourth board body 535 away from the first board body 51 relative to the third board body 534. There is a gap between the third board body 534 and the fourth board body 535. With the gap, the spring constant of the elastic portion on the elastic circuit board 5 can be reduced, the stabilization power consumption can be lowered, and the stabilization effect can be improved.

Figure 6:
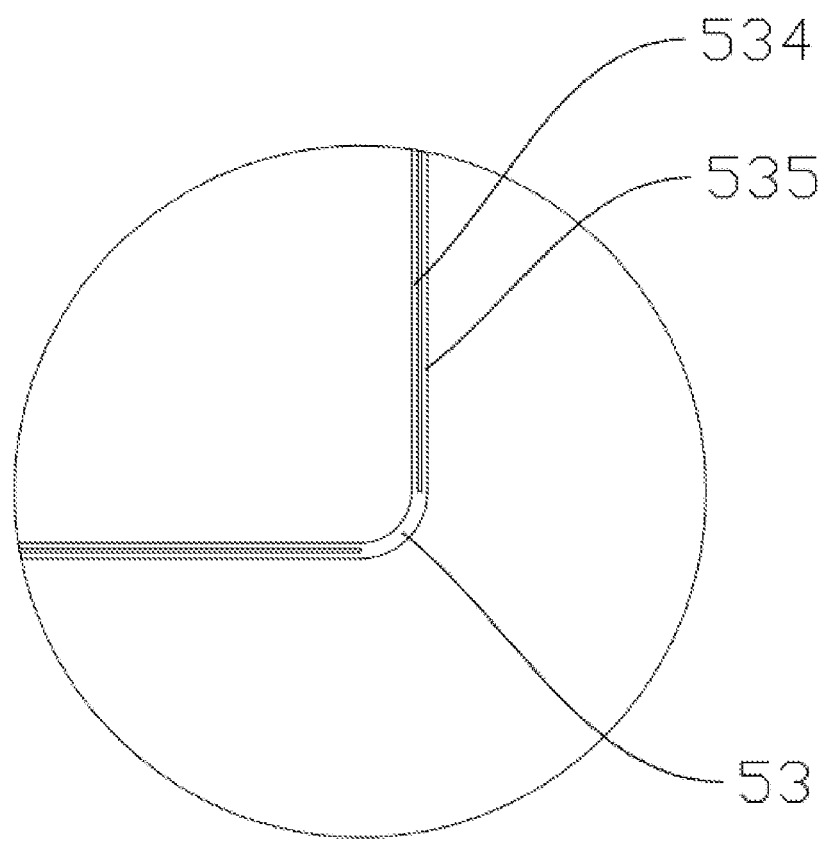
FIG. 6 is a partial structural view of another embodiment of a connecting portion.

As shown in FIG. 6, in other embodiments of the present disclosure, the first connecting arm 531 and the second connecting arm 532 each include at least two layers of stacked board bodies. The bending portion 533 is a whole board body. Because of no gap in the bending portion 533, the bending portion 533 is bent permanently by punching, for ease of production.

In other embodiments of the present disclosure, the elastic circuit board 5 may be a rigid-flex printed circuit board (PCB).

As shown in FIGS. 1-3, the camera stabilizer module in the preferred embodiment of the present disclosure includes the stabilizer assembly 8 and a controller 54. The stabilizer assembly 8 includes a stabilizing coil 801 and a stabilizing magnet 802 that are facing each other. The stabilizing coil 801 is electrically connected to the elastic circuit board 5. The stabilizing coil 801 may be wounded by a metal wire or consist of a circuit board. The controller 54 is electrically connected to the elastic circuit board 5, and can control the elastic circuit board 5 to supply power to the stabilizing coil 801. The stabilizing coil 801 is provided around the image sensor 4, and the stabilizing magnet 802 is facing the stabilizing coil 801 and provided around the lens 3, such that when the stabilizing coil 801 is energized, the image sensor 4 can be driven to move along at least two axial directions. When the camera stabilizer module works, the controller 54 controls supply power to the stabilizing coil 801 via the elastic circuit board 5 or stabilizing springs 85. After the stabilizing coil 801 is energized, the first board body 51 is driven to shift or rotate under the influence of a magnetic force of the stabilizing magnet 802, thereby driving the first board body 51 to implement biaxial or triaxial stabilization of the camera module.

In some embodiments of the present disclosure, a magnetic metal sheet may be provided near the stabilizing magnet 802, so as to facilitate the installation, improve the stabilization electromagnetic force and lower the stabilization power consumption.

Preferably, the controller 54 may be located on the second board body 52 or out of the second board body 52. The controller is configured to read shift information of the photographing device in the vibration sensor (such as an electronic gyroscope) of the photographing device, calculate a stabilizing angle and a control current, send a signal according to a calculated result to change a current in the stabilizing coil 801, and drive the image sensor 4 to make a multi-axis movement and implement a multi-axis stabilization effect.

As shown in FIGS. 1-3, in some embodiments of the present disclosure, the stabilizing coil 801 includes a first coil group 81 and a second coil group 82. The first coil group 81 is configured to shift the sensor carrier plate 6. The second coil group 82 is configured to rotate the sensor carrier plate 6. The stabilizing magnet 802 includes a first magnet group 83. The first magnet group 83 includes at least one shifting magnet 83a for driving the energized first coil group 81 to shift and at least one rotating magnet 83b for driving the second coil group 82 to rotate. Both the first coil group 81 and the second coil group 82 are fixed on the sensor carrier plate 6. The first magnet group 83 is provided above the first coil group 81, and may be fixed on the first housing 1 or the fixed seat 11, which is not specifically limited herein. With a magnetic field formed by at least one magnet in the first magnet group 83, the energized first coil group 81 drives the sensor carrier plate 6 to shift in the plane where the first board body 51 is located. With the magnetic field formed by at least one magnet in the first magnet group 83, the energized second coil group 82 drives the sensor carrier plate 6 to rotate in the plane where the first board body 51 is located.

As shown in FIGS. 1-3, in some embodiments of the present disclosure, the first coil group 81 includes at least one first coil 811 at an edge of one side of the sensor carrier plate 6. The second coil group 82 includes at least two coils arranged in a length direction of the second coil group. A length of the coil in the second coil group 82 does not exceed a half of the edge of the sensor carrier plate 6 at maximum. The at least two coils in the second coil group 82 have opposite current directions. The second coil group 82 is symmetric to the first coil group 81 with respect to the image sensor 4, and is provided at the other side of the sensor carrier plate 6. Preferably, the second coil group 82 is provided as two same coils. The two coils are provided at the edge of the sensor carrier plate 6 in parallel in the length direction. The first magnet group 83 includes a magnet right above the first coil group 81 and a magnet right above the second coil group 82.

In some embodiments of the present disclosure, an included angle between directions of ampere forces generated by the two coils in the second coil group 82 is greater than 160°. As a result, the coils energized in the second coil group 82 can apply forces along different directions, and thus the second coil group 82 drives the sensor carrier plate 6 to rotate clockwise or anticlockwise in a plane of the sensor carrier plate.

As shown in FIGS. 1-3, in some embodiments of the present disclosure, the first coil group 81 further includes a third coil 812. The third coil 812 is perpendicular to the first coil 811 and is provided at one edge of the sensor carrier plate 6, such that a direction of an ampere force output by the energized first coil 811 is perpendicular to a direction of an ampere force output by the energized third coil 812. The stabilizing magnet 802 includes a second magnet group 84. The second magnet group 84 is parallel to the third coil 812 and is provided above the third coil 812. The second magnet group 84 includes at least one magnet to apply a magnetic force to the energized third coil 812, such that the energized third coil 812 drives the sensor carrier plate 6 to shift along the length direction of the first coil 811. Preferably, the second magnet group 84 includes two magnets arranged in parallel at a same height. The magnet in the second magnet group 84 is perpendicular to the magnet in the first magnet group 83, so as not to affect respective magnetic fields.

Based on the above solutions, when the sensor carrier plate 6 moves horizontally in the plane where the sensor carrier plate is located, there are the following cases: When the sensor carrier plate 6 moves on an X axis of the plane where the sensor carrier plate is located, the first coil 811 is energized. Under an action of a magnetic force from at least one magnet in the first magnetic group 83, the energized first coil 811 pushes the sensor carrier plate 6 to move toward the X-axis direction. In this case, the second connecting arm 532 bends and deforms, but there is almost no deformation of the first connecting arm 531. The almost no deformation means that the deformation amount of the first connecting arm 531 is at least 50% less than that of the second connecting arm 532, namely the second connecting arm 532 provides the deformation required when the sensor carrier plate 6 moves toward the X-axis direction. When the sensor carrier plate 6 moves on the Y axis, the third coil 812 is energized. Under an action of a magnetic force from at least one magnet in the second magnet group 84, the energized third coil 812 pushes the sensor carrier plate 6 to move toward the Y-axis direction. The first connecting arm 531 bends and deforms, but there is almost no deformation of the second connecting arm 532. The almost no deformation means that the deformation amount of the second connecting arm 532 is at least 50% less than that of the first connecting arm 531, namely the first connecting arm 531 provides the deformation required when the sensor carrier plate 6 moves toward the Y-axis direction. Further, when the sensor carrier plate 6 moves in the plane where the sensor carrier plate is located and along neither the X axis or the Y axis, the first coil 811 and the third coil 812 are energized at the same time. Under a combined action of magnetic forces from the first magnet group 83 and the second magnet group 84, the energized first coil 811 and third coil 812 drive the sensor carrier plate 6 to shift along a required direction in the plane where the sensor carrier plate is located, and the first connecting arm 531 and the second connecting arm 532 each provide a part of deformation to allow the sensor carrier plate to move horizontally.

When the sensor carrier plate 6 rotates in the plane where the sensor carrier plate is located, namely along an Rz direction, there are the following cases: When the sensor carrier plate 6 needs to rotate along one direction, one of the coils in the second coil group 82 is energized. Under an action of at least one magnet in the first magnet group 83, a force is applied to the sensor carrier plate 6. As the second coil only takes up a half of the edge of the sensor carrier plate 6, only the half of the edge of the sensor carrier plate 6 is stressed. In this case, the sensor carrier plate 6 tends to rotate toward the direction of the ampere force of the energized second coil, and rotates around the image sensor 4. The first connecting arm 531 and the second connecting arm 532 deform with the rotation direction of the sensor carrier plate 6. The first connecting arm 531 and the second connecting arm 532 provide deformation required by the sensor to rotate along the Rz direction. When the sensor carrier plate 6 rotates along the other direction, the other second coil in the second coil group 82 is energized to drive the sensor carrier plate 6 to rotate along the other direction. In this case, the first connecting arm 531 and the second connecting arm 532 deform along the other direction with the sensor carrier plate 6. The first connecting arm 531 and the second connecting arm 532 provide deformation required by the sensor carrier plate 6 to rotate along the other direction of the Rz direction. In some embodiments of the present disclosure, both coils in the second coil group 82 can be energized at the same time to provide ampere forces in opposite directions, a torque in Rz direction and thus control the rotation of the sensor carrier plate 6.

As shown in FIGS. 1-3, in some embodiments of the present disclosure, the camera stabilizer module further includes the focus assembly 9. The focus assembly includes a focus magnet 91 fixed inside the first housing 1 and a focus coil 92 facing the focus magnet 91 and provided on the lens carrier plate 7. The focus coil 92 is electrically connected to the elastic circuit board 5 and drives the lens carrier plate 7 to move under an action of the focus magnet 91 when energized. Specifically, the focus coil 92 is sleeved on the lens 3. The lens carrier plate 7 for fixing the lens 3 has a DOF to move along a direction of an optical axis of the lens 3. As a result, the lens 3 can move along the direction of its optical axis. At least one focus magnet 91 is provided inside the first housing 1, so as to drive the energized focus coil 92, thereby driving the lens 3 for focusing.

In some embodiments of the present disclosure, the focus assembly 9 may include a memory metal motor and a piezoelectric motor.

As shown in FIGS. 1-3, in some embodiments of the present disclosure, the camera stabilizer module further includes at least one focus spring group 93. The focus spring group 93 includes two pieces of focus springs. The two pieces of focus springs are separately provided above and below the lens carrier plate 7. With the two pieces of focus springs, the collisions to the housing during focusing of the lens 3 carrier can be prevented, a good buffer action is achieved, and the lens 3 carrier is reset upon the completion of photographing.

Figure 7:
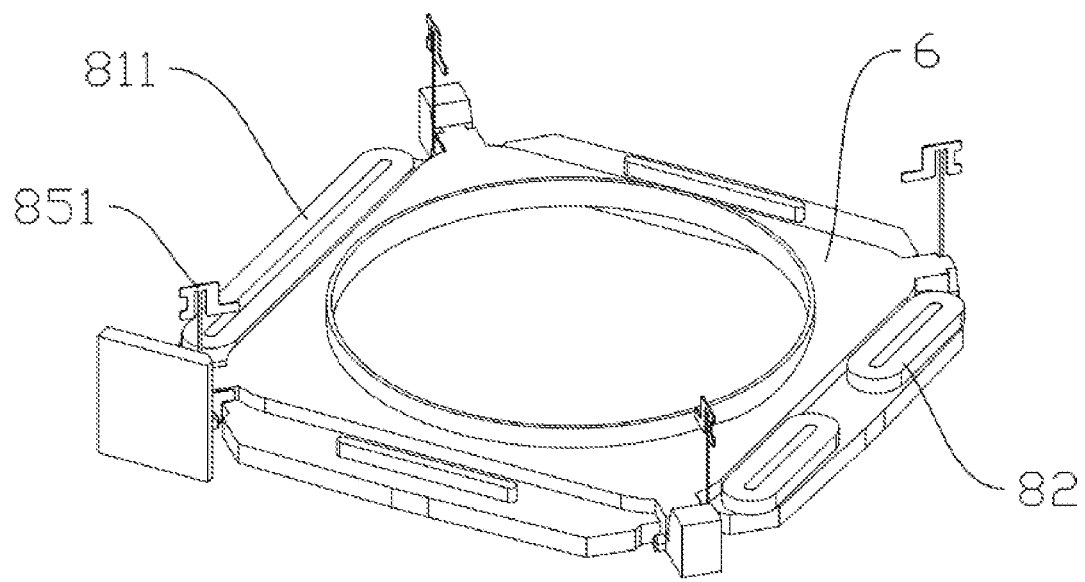
FIG. 7 is a structural view of a sensor carrier plate of a camera stabilizer module according to an embodiment of the present disclosure.
Figure 8:
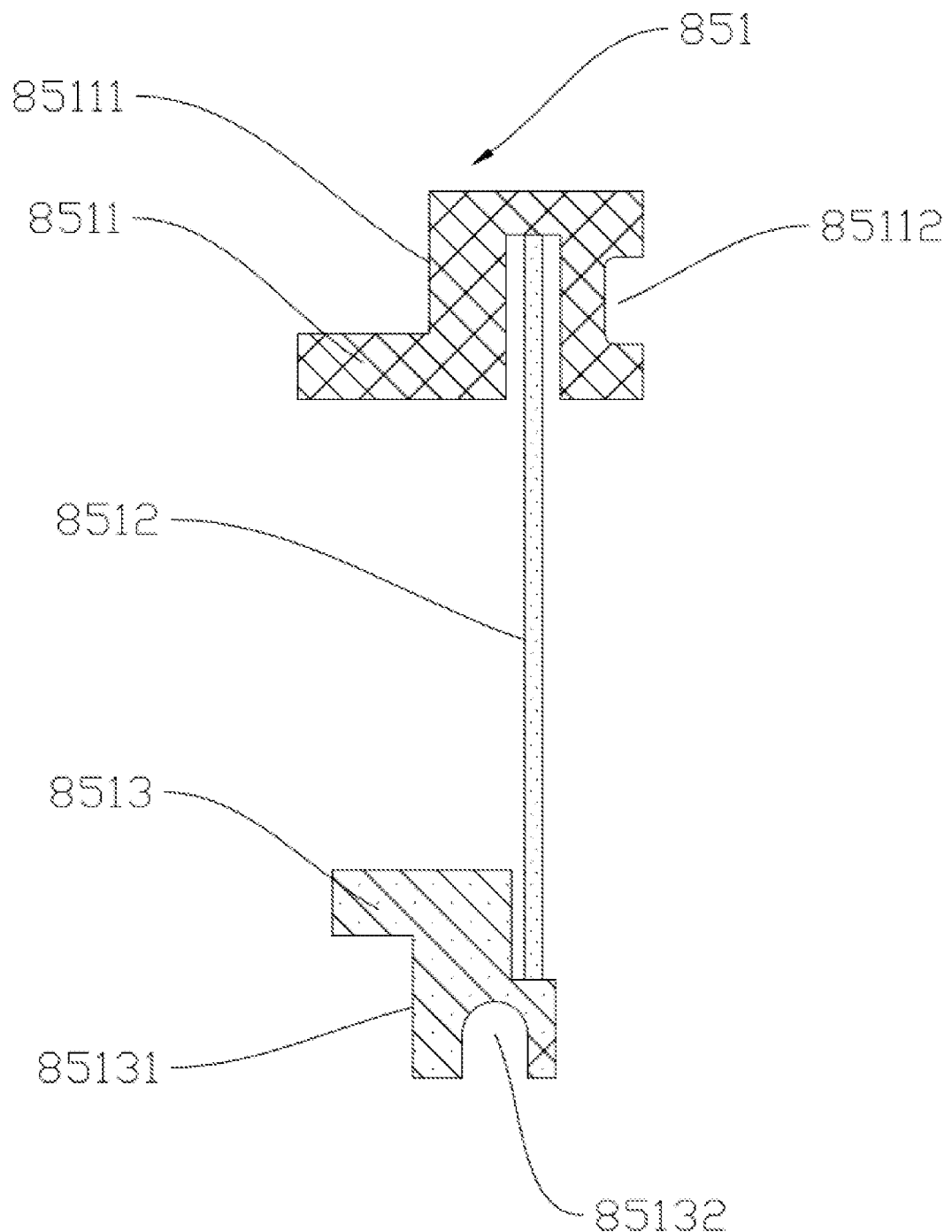
FIG. 8 is a structural view of a stabilizing spring of a camera stabilizer module according to an embodiment of the present disclosure.

As shown in FIG. 7 and FIG. 8, in some embodiments of the present disclosure, the camera stabilizer module further includes stabilizing springs 85. The stabilizing springs 85 can effectively reduce the spring constant of the roll axis (namely the Rz direction), and can also compensate the large spring constant of the roll axis arising from other elastic components (such as the elastic portion in the circuit board of the sensor). The stabilizing springs 85 are provided at the periphery of the image sensor 4. Preferably, the camera stabilizer module includes at least four groups of the stabilizing springs 85. The stabilizing springs 85 each include one end connected to the first housing 1 or the fixed seat 11, and the other end connected to the sensor carrier plate 6. The stabilizing springs 85 are uniformly distributed at the edges or corners of the sensor carrier plate 6. Further, each group of the stabilizing springs 85 includes at least one spaced spring piece 851.Two ends of the spring piece 851 each are electrically connected to the stabilizing coil 801 and the first board body 51.

As shown in FIG. 7 and FIG. 8, in some embodiments of the present disclosure, the spring pieces 851 each include a fixed portion 8511, an elastic portion 8512 and a movable portion 8513. A width-to-thickness ratio of each elastic portion 8512 is not less than 2:1. Two ends of the elastic portion 8512 are separately connected to the fixed portion 8511 and the movable portion 8513. The fixed portion 8511 is connected to the locating seat 11, while the movable portion 8513 is connected to the sensor carrier plate 6. Preferably, the spring pieces 851 each include a centerline that connects centers of cross sections at two junctions between the elastic portion 8512, the unmovable portion and the movable portion. An included angle between the centerline and the optical axis of the lens 3 is less than 10°. The maximum distance between the edge of the spring piece 851 and the centerline is 20% less than the length of the centerline.

As shown in FIG. 7 and FIG. 8, preferably, the fixed portion 8511 includes one side provided with a first locating groove 85111, and the other side provided with a first clamping groove 85112. A second locating groove 85131 at the same side as the first locating groove 85111 and a downward second clamping groove 85132 are formed at one side of the movable portion 8513. Specifically, through the first locating groove 85111, the fixed portion 8511 of the spring piece 851 can be located with the locating seat 11 or the first board body 51, for ease of installation. Through the first clamping groove, the fixed portion 8511 can be clamped on the locating seat 11, such that the fixed portion 8511 is connected to the locating seat 11 more firmly. The movable portion 8513 is fixed on the sensor carrier plate 6 through the second clamping groove 85132 and the second locating groove 85131.

In some embodiments of the present disclosure, the elastic portion 8512 is a rod-like elastic portion 8512. Specifically, the rod-like elastic portion 8512 is tougher, and unlikely to break.

In some embodiments of the present disclosure, the elastic portion 8512 is a wavy elastic portion 8512. Specifically, the wavy elastic portion 8512 has the better elasticity and stronger anti-drop ability.

In some embodiments of the present disclosure, the elastic portion 8512 is a flaky elastic portion 8512. Specifically, the flaky elastic portion 8512 can be adapted to a small mounting space, and is more flexible and convenient.

In some embodiments of the present disclosure, at least one group of the stabilizing springs 85 are made of a conductive material. The stabilizing springs 85 each include one end electrically connected to a part or all of the stabilizing coil 801, and the other end connected to a conductive structure. The conductive structure may include a metal component in the locating seat 11. Specifically, the stabilizing coil 801 is directly connected to the conductive structure through the stabilizing springs 85, which ensures the use of the stabilizer module, and simplifies the internal structure of the motor because the stabilizing coil 801 and the conductive structure are unnecessarily connected by other components.

It is to be understood that the part or all of the stabilizing coil 801 may also be electrically connected through the elastic circuit board 5 rather than the stabilizing springs 85, which is not specifically defined herein.

Without the ball contact or frictional contact in the embodiment of the present disclosure, there is no misalignment problem of the stabilizing motor in the conventional SSS (refer to the patent: CN 102749697 B). Particularly when the vibration is imperceptible with the frequently changed direction, the stabilizer module in the present disclosure has the better stabilization effect. In addition, the camera stabilizer module in the present disclosure can be available for open-loop stabilization control and can also achieve the desirable stabilization effect, which simplifies the structure and production process of the camera module, and is beneficial for mass production or even automatic production. Therefore, the present disclosure is advantageous in cost, weight, size and power consumption of the motor and the module. At last, as the stabilizer assembly 8 in the present disclosure excludes the lens 3, the stabilizer assembly is lightweight, the power consumption required by the camera stabilizer module can be effectively lowered, and the high-frequency stabilization compensating effect is improved.

The present disclosure has the following working process: The elastic circuit board 5 is provided in the first housing 1 of the camera stabilizer module. The first board body 51 serving as a movable end and the second board body 52 serving as a fixed end are provided in the elastic circuit board 5. The first board body 51 is connected to the elastic connecting portion 53 extending toward the outward side of the surface of the first board body. Consequently, the first board body 51 has a DOF to shift and rotate in the plane where the first board body 51 is located, and the image sensor 4 connected to the first board body 51 can also shift and rotate with the first board body 51. When the camera stabilizer module works, the controller 54 controls supply power to the stabilizing coil 801 via the elastic circuit board 5 or stabilizing springs 85. After the stabilizing coil 801 is energized, the first board body 51 is driven to shift or rotate under the influence of a magnetic force of the stabilizing magnet 802, thereby driving the first board body 51 to implement biaxial or triaxial stabilization of the camera module.

In conclusion, the camera stabilizer module and the photographing device comprising the same provided by the embodiments of the present disclosure support shift and rotation of the multi-axis image sensor, with good stabilization effect, low power consumption, simple and compact structure, and easy assembly for mass production and automatic production.

The above are only preferred implementations of the present disclosure. It should be noted that several improvements and replacements may further be made by a person of ordinary skill in the art without departing from the principle of the present disclosure, and such improvements and replacements should also be deemed as falling within the protection scope of the present disclosure.

The invention claimed is:

1. A camera stabilizer module, comprising:
a housing comprising a first housing;
a sensor assembly comprising a lens and an image sensor, the lens being fixed on the first housing;
an elastic circuit board comprising a first board body and a second board body, wherein the image sensor is connected to the first board body, the first board body is connected to the second board body through a connecting portion, the connecting portion extends toward an outward side of a surface of the first board body, the second board body is connected to the first housing, the connecting portion comprises a first connecting arm and a second connecting arm that are connected to each other, one end of the first connecting arm is connected to the first board body, one end of the second connecting arm is connected to the second board body, a plane where the first connecting arm is located serves as a first plane, a plane where the second connecting arm is located serves as a second plane, an included angle between the first plane and the second plane falls within a range of 70-110°, and both an included angle between the first plane and the surface of the first board body, and an included angle between the second plane and the surface of the first board body fall within the range of 70-110°;

a stabilizer assembly comprising a stabilizing coil and a stabilizing magnet that are facing each other, the stabilizing coil being electrically connected to the elastic circuit board;

a controller being electrically connected to the elastic circuit board, wherein the stabilizing coil is provided around the image sensor, and the stabilizing magnet is facing the stabilizing coil and provided around the lens, such that when the stabilizing coil is energized, the image sensor is driven to move along at least two axial directions; and a sensor carrier plate and a lens carrier plate that are arranged in parallel, wherein the sensor carrier plate is fixed on the first board body, the lens carrier plate is fixed on the first housing, the image sensor is fixed on the sensor carrier plate, and the lens is fixed on the lens carrier plate;

wherein the stabilizing coil comprises a first coil group and a second coil group; the stabilizing magnet comprises a first magnet group; both the first coil group and the second coil group are fixed on the sensor carrier plate; the first magnet group is provided above the first coil group; with a magnetic field formed by the first magnet group, the energized first coil group drives the sensor carrier plate to shift in a plane where the first board body is located; and with the magnetic field formed by the first magnet group, the energized second coil group drives the sensor carrier plate to rotate in the plane where the first board body is located.

2. The camera stabilizer module according to claim 1, wherein the first coil group comprises at least one first coil at an edge of one side of the sensor carrier plate; the second coil group comprises at least two coils arranged in a length direction of the second coil group; the at least two coils in the second coil group have opposite current directions; the second coil group is symmetric to the first coil group with respect to the image sensor, and is provided at the other side of the sensor carrier plate; and the first magnet group comprises a magnet right above the first coil group and a magnet right above the second coil group.

3. The camera stabilizer module according to claim 2, wherein an included angle between directions of ampere forces generated by the two coils in the second coil group is greater than 160°.

4. The camera stabilizer module according to claim 2, wherein the first coil group further comprises a third coil, the third coil is perpendicular to the first coil, the stabilizing magnet comprises a second magnet group, and the second magnet group is parallel to the third coil and provided above the third coil, such that the energized third coil drives the sensor carrier plate to shift along a length direction of the first coil.

5. The camera stabilizer module according to claim 1, further comprising a focus assembly, wherein the focus assembly comprises a focus magnet fixed inside the first housing and a focus coil facing the focus magnet and provided on the lens carrier plate, and the focus coil is electrically connected to the elastic circuit board via a focus spring group and drives the lens carrier plate to move under an action of the focus magnet when energized.

6. The camera stabilizer module according to claim 1, further comprising at least four groups of stabilizing springs, wherein the stabilizing springs each comprise two ends respectively connected to the locating seat and the sensor carrier plate; the stabilizing springs are uniformly distributed at edges or corners of the sensor carrier plate; each group of the stabilizing springs comprises at least one spaced spring piece; and the two ends of the stabilizing springs each are electrically connected to a part or all of the stabilizing coil.

7. The camera stabilizer module according to claim 1, wherein the housing further comprises a second housing, the second housing is fixed on the second board body, and a dust cover is provided between the first housing and the second housing.

8. A photographing device, comprising at least one camera stabilizer module according to claim 1.

9. A photographing device, comprising at least one camera stabilizer module according to claim 2.

10. A photographing device, comprising at least one camera stabilizer module according to claim 3.

11. A photographing device, comprising at least one camera stabilizer module according to claim 4.

12. A photographing device, comprising at least one camera stabilizer module according to claim 5.

13. A photographing device, comprising at least one camera stabilizer module according to claim 6.

14. A photographing device, comprising at least one camera stabilizer module according to claim 7.

* * * * *